United States Patent [19]

Takata

[11] Patent Number: 5,694,262
[45] Date of Patent: Dec. 2, 1997

[54] METHOD AND APPARATUS FOR TRANSFERRING DATA AND MAKING ON-THE-FLY CORRECTION OF ERRORS

[75] Inventor: Yoshiyuki Takata, Kawasaki, Japan

[73] Assignee: Fujitsu Ltd., Kawasaki, Japan

[21] Appl. No.: 379,184

[22] Filed: Jan. 27, 1995

[30] Foreign Application Priority Data

Jan. 31, 1994 [JP] Japan .................................. 6-028878
May 18, 1994 [JP] Japan .................................. 6-103137

[51] Int. Cl.⁶ ............................................. G11B 5/09
[52] U.S. Cl. ............................................. 360/53
[58] Field of Search ............................ 360/48, 51, 53

[56] References Cited

FOREIGN PATENT DOCUMENTS 57-29165 2/1982 Japan .

OTHER PUBLICATIONS

JP reference No. 4–326687, English Abstract, "Recording and Reproducing Device" Mar. 31, 1993, Muto.

Primary Examiner—A. Psitos
Assistant Examiner—Alan Faber
Attorney, Agent, or Firm—Greer, Burns & Crain, Ltd.

[57] ABSTRACT

A method and apparatus for transferring data in a disc apparatus are disclosed which perform on-the-fly correction. The disc apparatus includes a disc drive for transferring read data to a disc controller after a head has read the data from a storage disc. This disc controller transfers the data from the disc drive to a host device. The data transferring method reads data recorded on the storage disc in a CKD format in which one block is composed of a plurality of subblocks each having an error correction code. Errors in the data are detected by use of an error detection code on a subblock-unit; and after correcting the data of the error-detected subblock, the corrected data on the subblock-unit are transferred with the data of at least the previous subblock, at a speed higher than a reading speed. The data transferring apparatus includes a read circuit for reading data recorded in a CKD format on the storage disc, in which one block is composed of a plurality of subblocks each having an error correction code. An error detection circuit detects an error in the read data by use of the error detection code on the subblock-unit; and a transfer circuit corrects the data of the error-detected subblock, and transfers the corrected data on the subblock-unit and, at the same time, transfers the data of at least the subblock positioned previous to the disc controller at the speed higher than the reading speed.

6 Claims, 20 Drawing Sheets

FIG. 4A VFO READ DATA
FIG. 4B VFO CLOCK HIGH-SPEED CLOCK
FIG. 4C DATA READ
FIG. 4D TRANSFER ENABLING
FIG. 4E COUNTER 31
FIG. 4F COUNTER 33
FIG. 4G BUFFER 34 (WT) (RD)
FIG. 4H ECC DECODER OUTPUT
FIG. 4I CTRL TRANSFER SAMPLING SIGNAL
FIG. 4J READ DATA AFTER BEING CORRECTED

FIG. 8

| PCN | SCC0 | SCC1 | SCC2 | SCC3 | SCC4 | SCC5 | SCC6 | LCN | PA | F | ID | KL | DL | ECC |

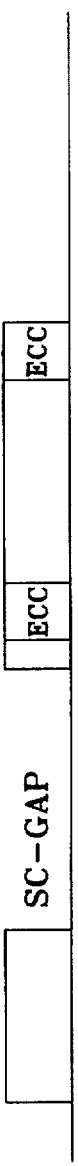
FIG. 9A CELL
FIG. 9B DATA ON DISK
FIG. 9C TAG OUT sync out null command
FIG. 9D TAG IN sync in null
FIG. 9E BUS
FIG. 9F CELL SIGNAL

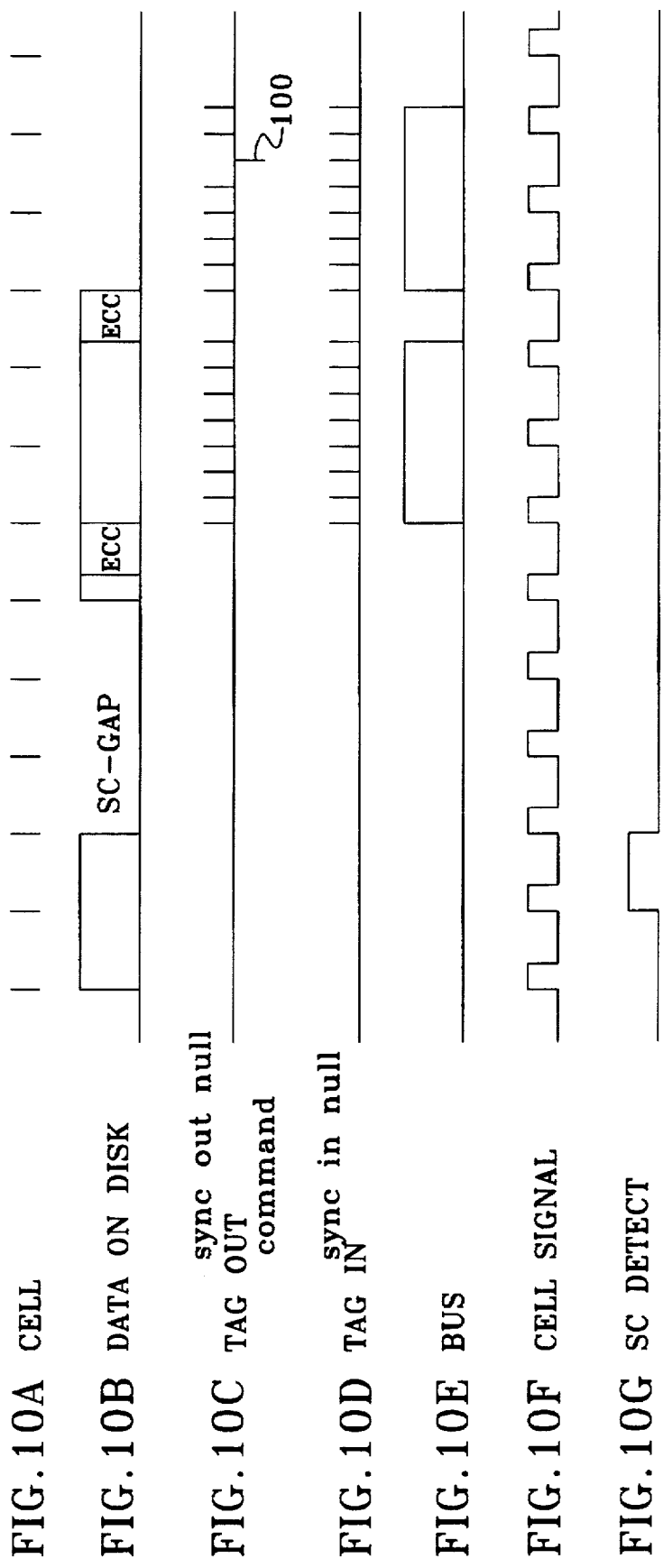

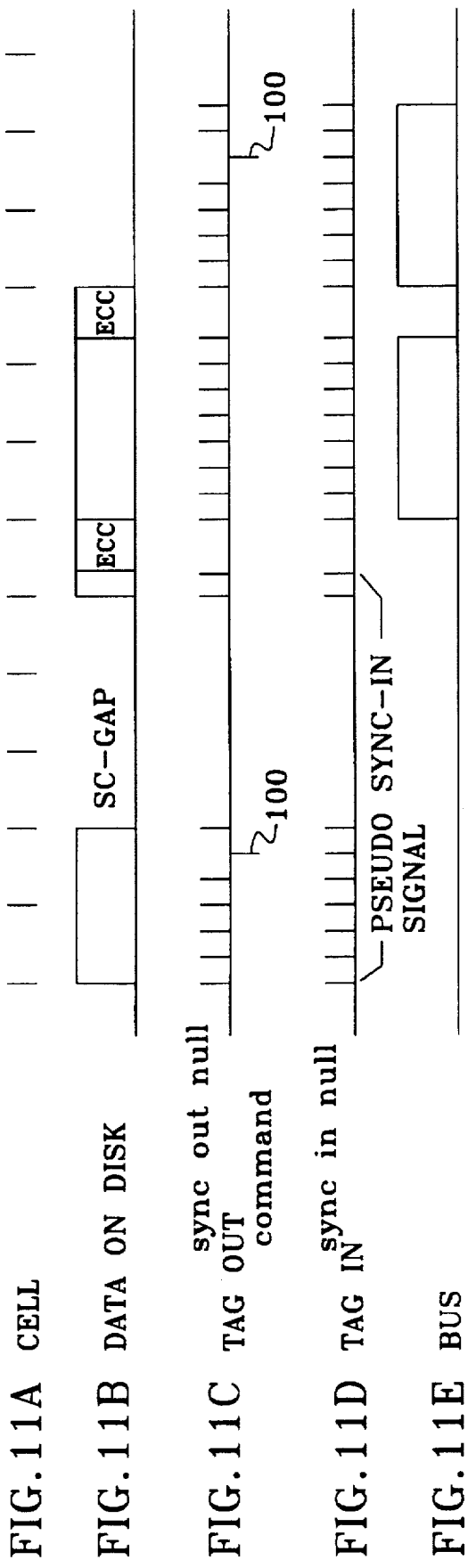

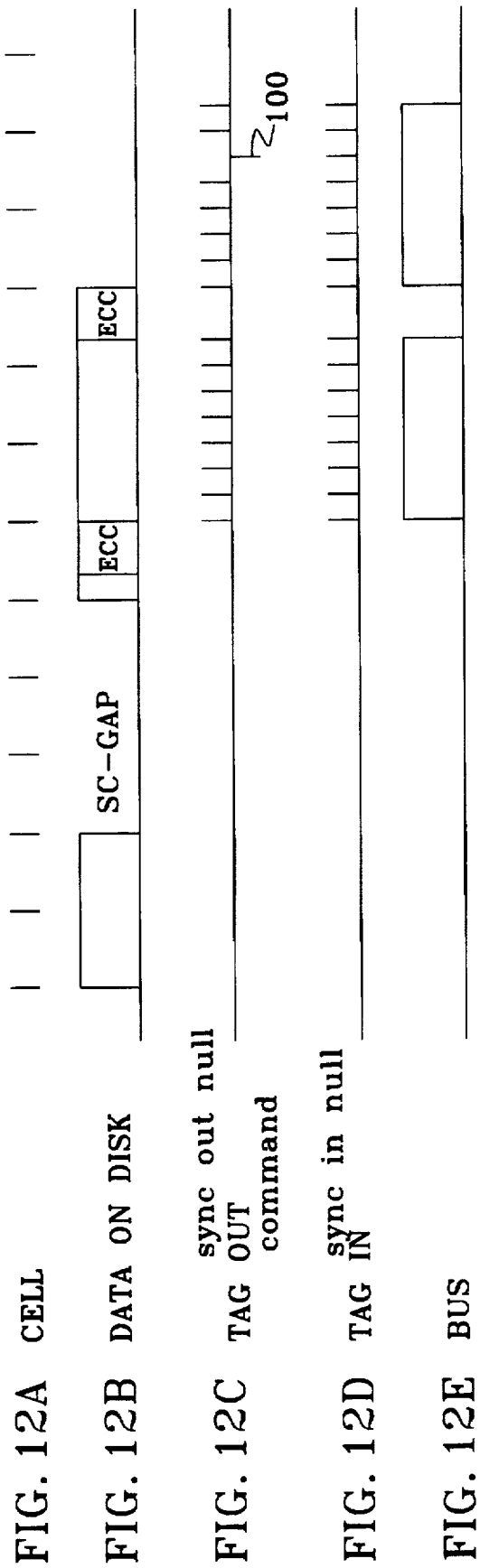

FIG. 15A (PRIOR ART) READ DATA
FIG. 15B (PRIOR ART) CTRL TRANSFER SAMPLING SIGNAL
FIG. 15C (PRIOR ART) CTRL TRANSFER DATA

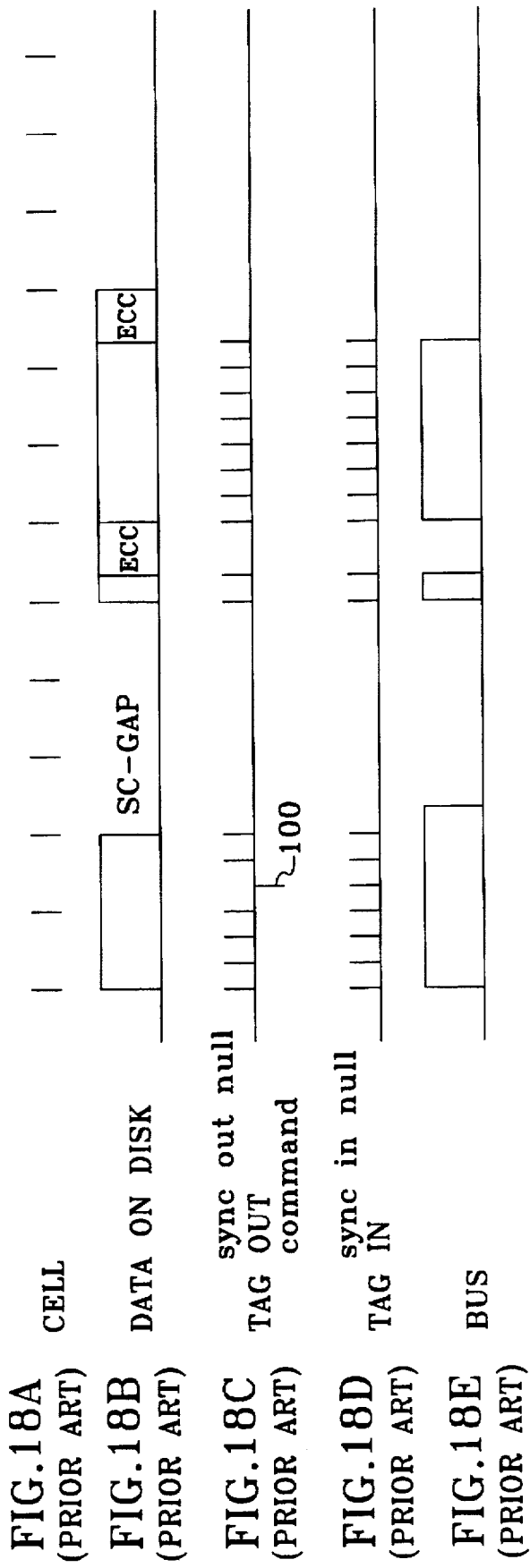

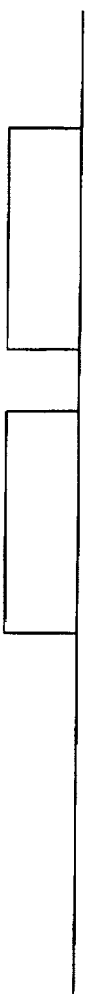
FIG. 19A (PRIOR ART) DATA ON DISK
FIG. 19B (PRIOR ART) TAG OUT — sync out null / command
FIG. 19C (PRIOR ART) TAG IN — sync in null
FIG. 19D (PRIOR ART) BUS

METHOD AND APPARATUS FOR TRANSFERRING DATA AND MAKING ON-THE-FLY CORRECTION OF ERRORS

BACKGROUND OF THE INVENTION

1. Field of the Invention

The present invention relates to a method of and an apparatus for transferring data in a disc apparatus, which serve to perform an on-the-fly correction with respect to the data recorded in a CKD format and transfer the corrected data.

2. Description of the Related Art

A magnetic disc apparatus and a magneto-optic disc apparatus have adopted a high-density recording method in recent years. There arise, however, problems in which adopting this high-density record leads to a decrease in reading margin and to a difficulty of enhancing the quality of a recording medium. These problems in turn may cause an error of read data.

For this reason, an error correction code is added to the data. An apparatus utilizing a CKD (Count/Key/Data) format for correcting this error has involved a wide-use of an off-line correction method. According to this method, when detecting the data error on the magnetic disc drive, a magnetic disc controller is informed of this detection and corrects the error.

On the other hand, in terms of improving a throughput, there is needed an error correction by an on-the-fly method by which the read erroneous data is instantaneously corrected on the magnetic disc drive side, and the controller is informed of clean data.

FIGS. 14A and 14B are explanatory diagrams showing the CKD format. FIG. 15(A)–(C) is an explanatory diagram illustrating a conventional data transfer technique.

As illustrated in FIG. 14A, all the tracks start with index marks (INDEX) and are ended with the index marks. The track consists of a home address (HA) and records R0–Rn. They are segmented by gaps. Further, each record (data) is composed of a count part (COUNT), a key part (KEY) and a data part (DATA). They are also segmented by gaps.

As shown in FIG. 14B, one block of the data written to the magnetic disc is subdivided into a plurality of subblocks each having a fixed length. A subblock error correction code (ECC) is added to the end of each subblock. The Figure illustrates an example where an item of 1-block 8-byte data is subdivided into two subblocks each consisting of 4 bytes. A data error of the data read from the magnetic disc is detected and corrected based on the subblock error correction code.

As shown in FIG. 15(A)–(C), a conventional reading operation involves reading the data of the subblock and the subblock error correction code and performing the data error detection and correction of the subblock. Thereafter, the subblock data after being corrected is transferred to a magnetic disc controller (CTRL) at the same speed as a data reading speed in synchronism with a rotation of the magnetic disc. That is, a read cyclic signal from the magnetic disc is availed as a transfer sampling signal, and the data and the sampling signal are transferred. This data transfer has two ways, i.e., the whole records are transferred, and some of the records are transferred.

A first problem inherent in the on-the-fly correction is a reduction in storage capacity.

That is, in the CKD format, after finishing the data transfer, the controller is informed of the finishing thereof. Then, a next command is received from the controller. Hence, it may happen that the next command indicates the data next to the transferred data. In this case, it is required that a gap between the former data and the next data be determined in consideration of the transfer time and a transferring/receiving time of a control signal so as not to wait one rotation of the magnetic disc.

Normally, a subblock length, because of being 96 bytes–224 bytes, needs a 1.3–2 fold gap length in order to transfer the data after being corrected to the controller. For this reason, there arises a problem in which the storage capacity of the magnetic disc decreases.

Reversely, when decreasing the gap length, and if the data next to the transferred data is designated by the command, the problem is that there is a necessity for waiting one rotation of the magnetic disc.

A second problem inherent in the on-the-fly correction lies in a skip control function.

That is, even if a magnetic defect exists on the surface of the disc medium, the disc is employed so as to skip over this defective portion. A function to skip over this defective portion is known as a skip control function.

FIG. 16 is an explanatory diagram showing the skip control gap in the CKD format. FIG. 17 is an explanatory diagram showing a cell managing method of the subblock. FIG. 18(A)–(E) is a time chart in the conventional skip control technique. FIG. 19(A)–(D) is a time chart illustrating a conventional synchronous signal in the on-the-fly correction.

If the magnetic defect is seen on the disc medium, the data are written thereto to skip over this defect position. For example, as illustrated in FIG. 16, if a defective portion exists in a record Rn, a skip control gap SC-GAP is formed in a region having a predetermined length in this defective portion. Then, this gap is skipped over. Accordingly, the data in the record Rn is segmented, with the skip control gap SC-GAP being interposed therebetween and thus recorded.

On the other hand, each subblock is cell-managed by a cell signal created inwardly of the drive from the reading signal. As illustrated in FIG. 17, for instance, there is set a cell for segmenting an item of track-directional data on the magnetic disc at an interval of 34 bytes. Then, one subblock is set to have a 3-cell length including the error correction code (ECC).

Referring to FIG. 17, a length of the data part of the subblock has 96 bytes, while the ECC part is set to 6 bytes. With this setting, the length of the subblock is defined by three cells 200–202. Note that the last subblock of one block is further added with a 6-byte ECC for one block as a whole. Accordingly, the length of the data part of the last subblock has 84 bytes.

There will be described a data transfer in which the above skip control gap SC-GAP is set with reference to FIG. 18.

The data on the disc medium is, as illustrated in the Figure, segmented by a track-directional cell boundary line CELL. FIG. 18(A)–(E) illustrates a case where the skip control gap SC-GAP exists in the 3-cell subblock. That is, the 3-cell skip control gap SC-GAP is provided subsequent to a 2-cell data area. Remaining 1-cell data and the ECC are recorded in a 1-cell area after the skip control gap SC-GAP.

In the data transfer between the disc drive and the controller, the disc drive transmits the data to the controller, and, at the same time, a sync-in null signal is transmitted as a synchronous signal to a tag-in signal line of an interface. On the other hand, the controller, upon receiving the sync-in null signal, transmits a sync-out null signal as a response thereto via a tag-out signal line of the interface to the disc drive.

Then, in the case of finishing the data transfer, the controller issues a command to the tag-out signal line. The drive thereby recognizes it as a sync-out stop indicting a stop of the synchronous transfer. The disc drive, after transmitting the data and the sync-out null signal determined afterward, finishes the transmission of the data.

The controller indicates the disc drive to skip over the defective portion by making use of this function. That is, the controller recognizes the defect position from the defect data stored in the count part. Then, a head position is detected by the sync-in null signal defined as the synchronous signal. Further, the controller, immediately in front of the defect position, issues the command 100 indicating the skip processing to the disc drive.

With this processing, the disc drive, after finishing the 2-cell data transfer, stops the data transfer during a passage of the head through the 3-cell skip control gap SC-GAP, whereby the defect position is skipped over.

According to the on-the-fly correction method, however, as illustrated in FIG. 19(A)–(D), the first subblock is transferred during the read of the next subblock. The above-mentioned transfer synchronous signal, i.e., the sync-in null signal is transmitted in synchronism with the transfer of the subblock. Namely, the transfer is effected asynchronously with the reading by the head. For this reason, the controller is incapable of detecting the head position from the sync-in null signal.

Hence, it is difficult to issue the command indicating the skip processing at the timing corresponding to the defect position on the disc medium. Accordingly, even if the skip control gap is provided in the subblock, the skip control can not be actualized.

SUMMARY OF THE INVENTION

Accordingly, it is a primary object of the present invention to provide a method of and an apparatus for transferring data in a disc apparatus that serve to actualize a large capacity storage by minimizing a gap length on a disc according to an on-the-fly method.

It is another object of the present invention to provide a method of and an apparatus for transferring data in a disc apparatus that serve to actualize the large capacity storage by reducing a data transfer time and minimizing the gap length on the disc.

It is still another object of the present invention to provide a method of and an apparatus for transferring data in a disc apparatus that serve to easily actualize a skip control function according to the on-the-fly method.

To accomplish the objects given above, according to one aspect of the present invention, there is provided a method of transferring data in a disc apparatus including a disc drive for transferring, after a head has read the data from a storage disc, the read data to a disc controller and the disc controller for transferring the transfer data from the disc drive to a host device. This data transferring method comprises: a step of reading data from the storage disc, the data being recorded in a CKD format on the storage disc and having one block composed of a plurality of subblocks each added with an error correction code; a step of detecting an error in the data read from the storage disc by use of an error detection code on a subblock-unit; and a step of transferring, after correcting the data of the error-detected subblock, the corrected data to the disc controller on the subblock-unit, the transferring step including a step of transferring the data of at least the subblock positioned last to the disc controller at a speed higher than a reading speed.

According to another aspect of the present invention, there is provided an apparatus for transferring data in a disc apparatus including a disc drive for transferring, after a head has read the data from a storage disc, the read data to a disc controller and the disc controller for transferring the transfer data from the disc drive to a host device. This data transferring apparatus comprises: a read circuit for reading data from the storage disc, the data being recorded in a CKD format on the storage disc and having one block composed of a plurality of subblocks each added with an error correction code; an error detection circuit for detecting an error in the read data by use of an error detection code on a subblock-unit; and a circuit for transferring, after correcting the data of the error-detected subblock, the corrected data to the disc controller on the subblock-unit, the transferring circuit transferring the data of at least the subblock positioned last to the disc controller at a speed higher than a reading speed.

According to the present invention, the attention is paid to such a point that the data-to-data gap corresponds to a transfer time of the last subblock and a transferring/receiving time of a control signal. This transferring/receiving time of the control signal can not be reduced, and therefore the determination is that the transfer time is to be decreased. Hitherto, the data is transferred at a speed coincident with a reading cycle, and hence it takes much time. If transferred at a high speed asynchronous with the reading process, however, the transfer time can be reduced. For this reason, according to the present invention, the data after an error has been corrected is asynchronously transferred at the high speed, thereby reducing the transfer time. Thus, the gap length on the disc is minimized.

This transferring method is classified into a method of asynchronously transferring all the subblocks serving as a target at the high speed and a method of asynchronously transferring only the last subblock among the subblocks serving as the target at the high speed. The data-to-data gap length can be minimized by adopting any of these methods.

According to still another aspect of the present invention, there is provided a method of transferring data in a disc apparatus including a disc drive for, after a head has read the data from a storage disc, the data being recorded in a CKD format on the storage disc and having one block composed of a plurality of subblocks each added with an error correction code, detecting an error of the read data on a subblock-unit, correcting the error of the data of the subblock by use of the error correction code and transferring the error-corrected data to the disc controller on the subblock-unit and the disc controller for transferring the transfer data from the disc drive to a host device. This data transferring method comprises: a step of informing the disc controller of a cell signal generated synchronizing with a position of the head to indicate a position of the head in a track direction on the storage disc; a step of causing the disc controller to recognize a defect position on the storage disc on the basis of the data from the disc drive; and a step of indicating the disc drive to perform skip processing to skip the read from the storage disc in the defect position recognized by the disc controller after detecting the head position by the cell signal.

According to the above aspect of the present invention, the disc drive generates the cell signal indicating the head position separately from the synchronous signal of the data, and, therefore, the controller is capable of detecting the head position. For this reason, the skip processing can be indicated at a timing corresponding to the head position on the basis of an item of defect data given from the disc drive.

Further, according to yet another aspect of the present invention, there is provided a method of transferring data in a disc apparatus including a disc drive for, after a head has read the data from a storage disc, the data being recorded in a CKD format on the storage disc and having one block composed of a plurality of subblocks each added with an error correction code, detecting an error of the read data on a subblock-unit, correcting the error of the data of the subblock by use of the error correction code and transferring the error-corrected data to the disc controller on the subblock-unit and the disc controller for transferring the transfer data from the disc drive to a host device. The data transferring method comprises: a step of informing the disc controller of a synchronous signal synchronizing with reading of the data and a transfer of the data to indicate a position of the head in a track direction on the storage disc; a step of causing the disc controller to recognize a defect position on the storage disc on the basis of the data from the disc drive; and a step of indicating the disc drive to perform skip processing to skip the read from the storage disc in the defect position recognized by the disc controller after detecting the head position by the synchronous signal.

According to the above aspect of the present invention, the controller is informed of the synchronous signal synchronizing with the read and transfer of the data. The controller is therefore capable of detecting the head position. With this operation, the skip processing can be indicated based on the defect data from the disc drive at a timing corresponding to the head position.

According to a still further aspect of the present invention, there is provided a method of transferring data in a disc apparatus including a disc drive for, after a head has read the data from a storage disc, the data being recorded in a CKD format on the storage disc and having one block composed of a plurality of subblocks each added with an error correction code, detecting an error of the read data on a subblock-unit, correcting the error of the data of the subblock by use of the error correction code and transferring the error-corrected data to the disc controller on the subblock-unit and the disc controller for transferring the transfer data from the disc drive to a host device. This data transferring method comprises: a step of detecting a position of the head in a track direction on the storage disc through the disc drive; a step of recognizing a defect position on the storage disc from the read data through the disc drive; and a step of executing skip processing to skip the read from said storage disc in the recognized defect position after detecting the head position through the disc drive.

According to the above aspect of the present invention, the disc drive detects the head position and then recognizes the defect position of a disc medium, thereby making it possible to perform the skip processing. Accordingly, the controller is not required to detect the head position.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 8 is a diagram illustrating a structure of a counter part in a CKD format;

FIG. 9 is a time chart in one embodiment of skip control according to the present invention;

FIG. 10 is a time chart in another embodiment of the skip control according to the present invention;

FIG. 11 is a time chart in still another embodiment of the skip control according to the present invention;

FIG. 12 is a time chart in yet another embodiment of the present invention;

FIG. 15 is a time chart in the prior art;

FIG. 18 is a time chart of assistance in explaining the prior art but shows a transfer operation; and FIG. 19 is an explanatory diagram of assistance in explaining the prior art but illustrates a synchronous signal.

DETAILED DESCRIPTION OF THE PREFERRED EMBODIMENTS

FIG. 1(A)–(C) is a transfer time chart in one embodiment of the present invention.

Figure 1:
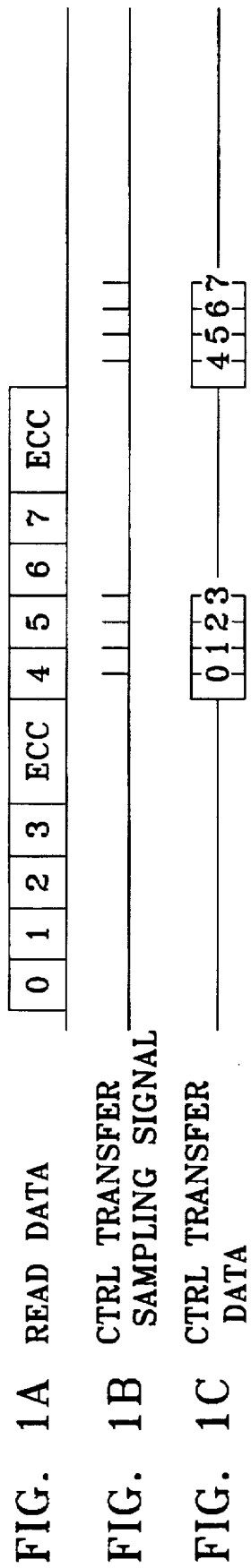
FIG. 1 is a transfer time chart in one embodiment of the present invention.

Referring to FIG. 1, for simplifying the explanation, a subblock length is 4 bytes, and a data length is 8 bytes. That is, an error correction code (ECC) is added at an interval of 4 bytes. In this example, after reading the 4-byte subblock and the error correction code, an error is corrected, and a subblock after being corrected is transferred by a high-speed sampling signal with a cycle higher than a reading cycle.

If done in this manner, it is possible to reduce a data transfer time after reading the last subblock, and a data-to-data gap length can be minimized.

Figure 2:
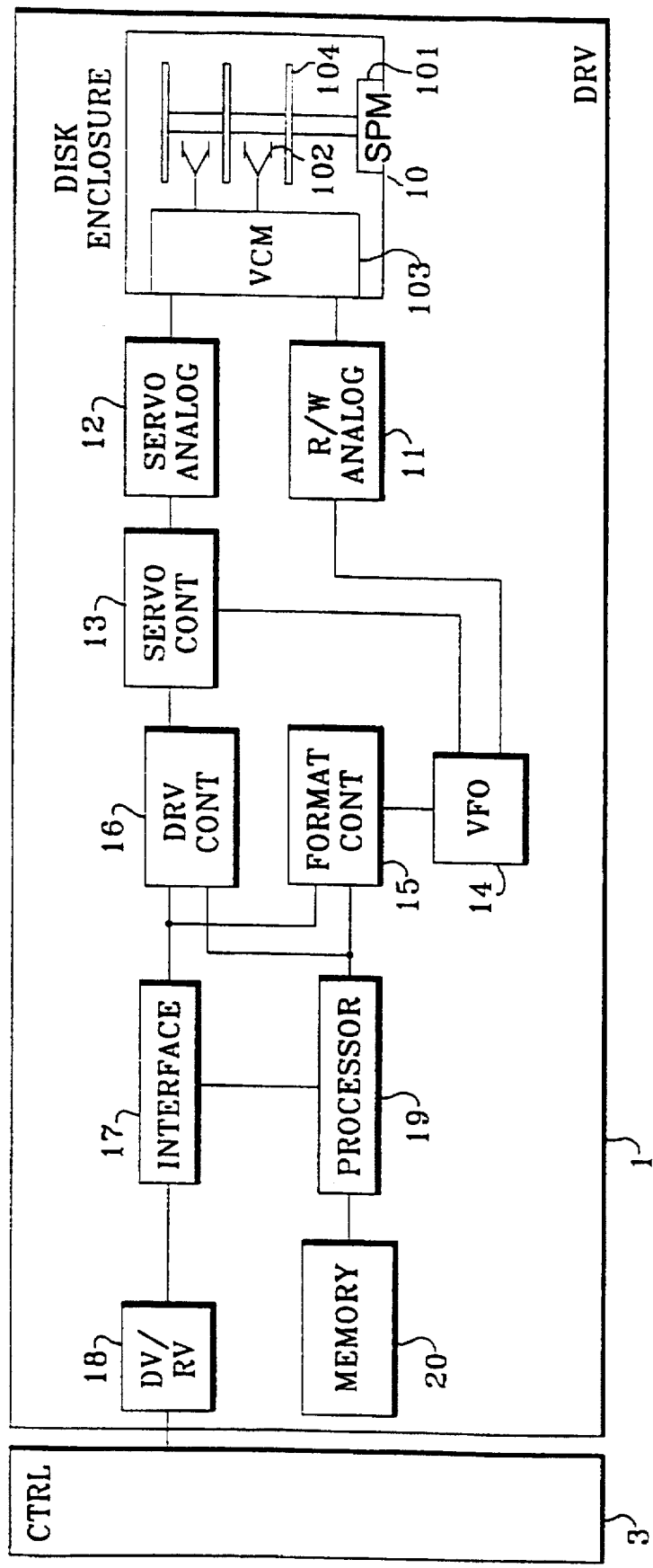
FIG. 2 is a whole block diagram in one embodiment of the present invention.

FIG. 2 is a block diagram illustrating the whole of an apparatus in one embodiment of the present.

As illustrated in FIG. 2, a magnetic disc drive apparatus 1 is connected to a magnetic disc controller 3.

The magnetic disc drive apparatus 1 includes a magnetic disc drive mechanism 10. The magnetic disc drive mechanism 10 has a magnetic disc 104 rotated by a spindle motor 101 and a magnetic head 102 for reading data on the magnetic disc 104. The magnetic disc drive mechanism 10 also has a voice coil motor 103 for positioning the magnetic head 102 at a desired track on the magnetic disc 104.

Figure 14A:
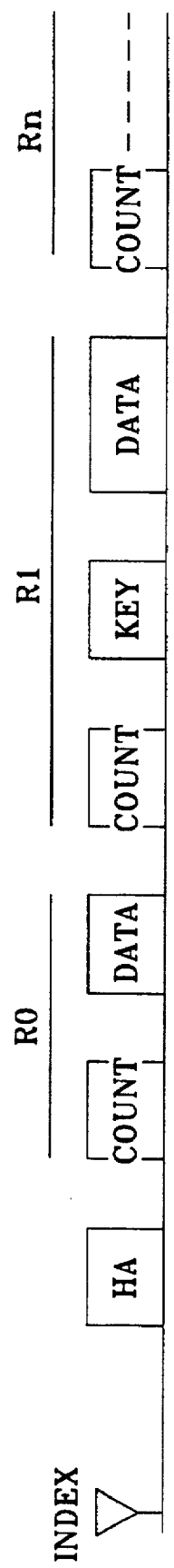
FIGS. 14A and 14B are explanatory diagrams of assistance in explaining the prior art but illustrate the CKD format.
Figure 14B:
Figure 16:
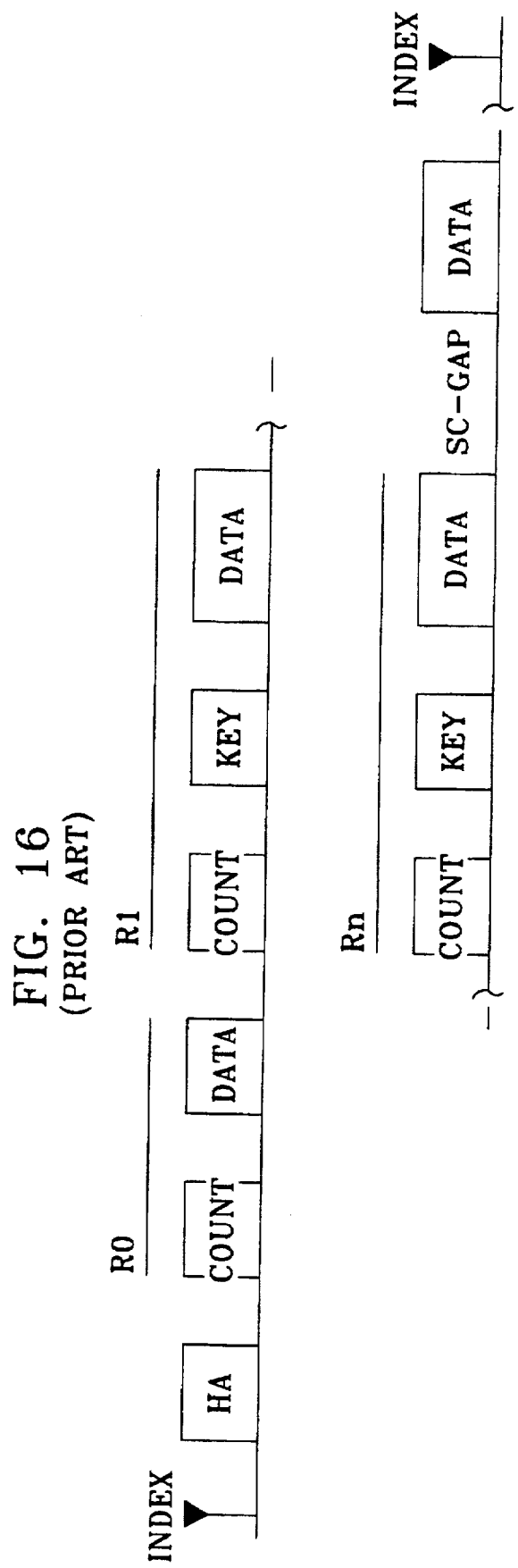
FIG. 16 is an explanatory diagram of assistance in explaining the prior art but illustrates a skip control gap.

The data are, as illustrated in FIG. 14A, recorded in a CKD format on this magnetic disc 104. Further, as shown in FIG. 14B, one block is subdivided into a plurality of subblocks, and the error correction code (ECC) is added to each subblock.

The magnetic disc drive apparatus 1 further includes a read/write analog circuit 11 for analog-processing read data and write data of the magnetic head. The magnetic disc drive apparatus 1 also includes a servo analog circuit 12 for driving a voice coil motor and a servo control circuit 13 for servo-controlling the voice coil motor.

The magnetic disc drive apparatus 1 has a VFO (Variable Frequency Oscillator) 14 connected to the servo control circuit 13 and the read/write analog circuit 11. The VFO 14 generates a clock based on servo data of the servo control circuit 13 and, at the same time, outputs the read data in synchronism with a synchronous clock.

A format control circuit 15 controls a read/write format. This circuit 15 will be described with reference to FIG. 3. A drive control circuit 16 indicates the servo control circuit 13 to effect a seek to a target track. An interface control circuit 17 controls an interface with the controller 3.

A driver/receiver 18 receives the data of the controller 3 and transmits the data to the controller 3. A processor 19 controls the interface control circuit 17, the drive control circuit 16 and the format control circuit 15. A program memory 20 stores programs executed by the processor 19.

Figure 3:
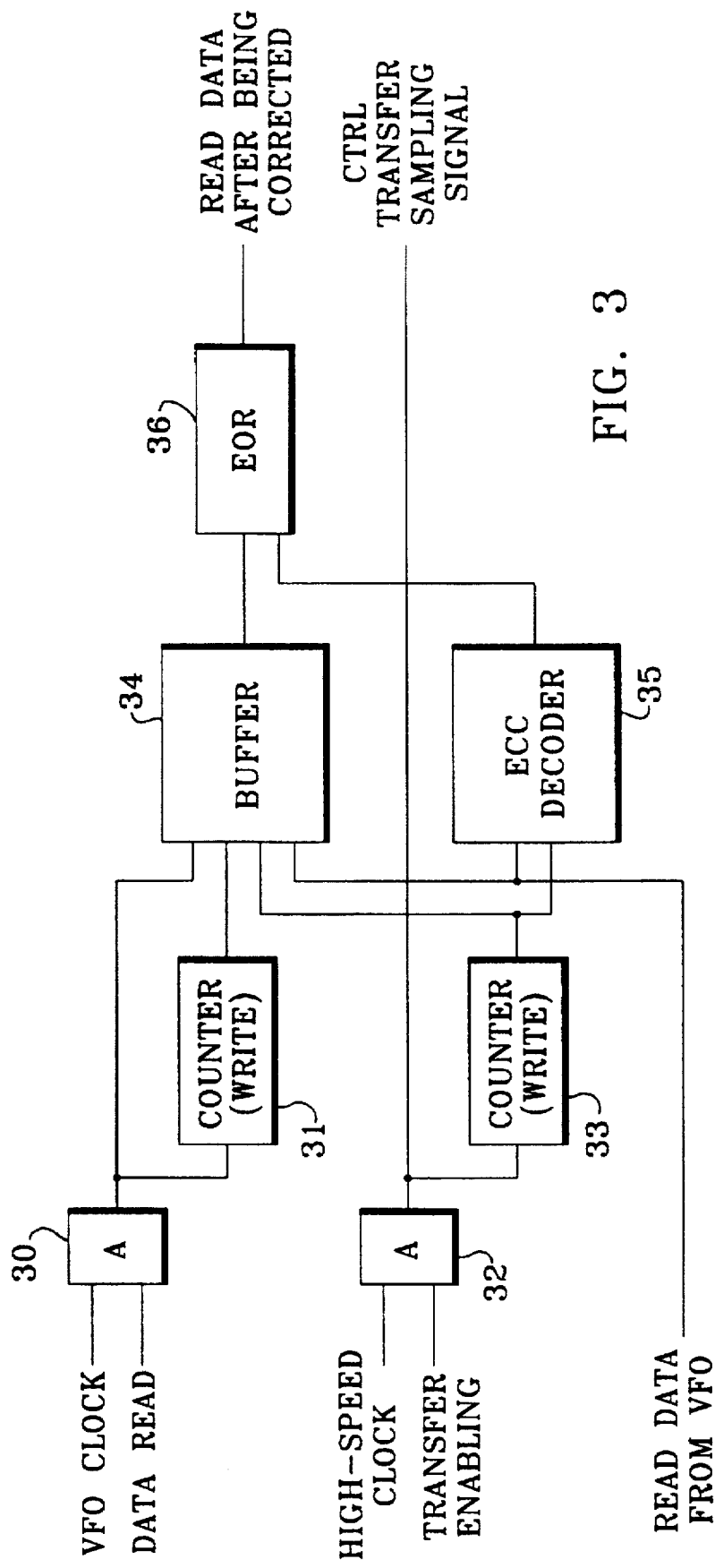
FIG. 3 is a circuit diagram illustrating a format control circuit of FIG. 2.

FIG. 3 is a circuit diagram of the format control circuit. FIG. 4(A)-(J) is a time chart thereof.

As shown in FIG. 3, an AND gate 30 uses a data read signal from the processor 19 as a gate signal and outputs VFO clocks (read synchronizing clocks) coming from the VFO 14 but synchronizing with rotations of the magnetic disc. A write counter 31 counts the VFO clocks outputted when the data read signal from the AND gate 30 is switched ON and creates a write address of a buffer memory 34.

An AND gate 32 uses a transfer enable signal from the processor 19 as a gate signal and outputs a high-speed clock from an unillustrated oscillator. A read counter 33 counts the high-speed clocks outputted when the transfer enable signal from the AND gate circuit 32 is switched ON and creates a read address of the buffer memory 34.

The buffer memory 34 stores the read data (data about the subblocks) from the VFO 14 in accordance with the write address of the counter 31. The buffer memory 34 then reads and outputs accumulated pieces of read data in accordance with the read address of the counter 33.

An ECC decoder 35 receives, when reading the data, inputting of the read data (the data on the subblocks and a subblock error correction code) and detects a data error in the subblock by use of the error correction code. The ECC decoder 35 creates an error pattern and an error displacement (error position). Then, the ECC decoder 35, when an output of the read counter 33 coincides with the error displacement, outputs the error pattern corresponding to that error displacement. If not coincident, the ECC decoder 35 outputs [0].

An EOR circuit 36 exclusive-ORs an output from the buffer memory 34 with the error pattern from the ECC decoder 35. Thus, the data error in the subblock is corrected. Then, an output thereof is transmitted to the interface control circuit 17, and the high-speed clock is sent as a sampling pulse to the controller 3.

Figure 4:
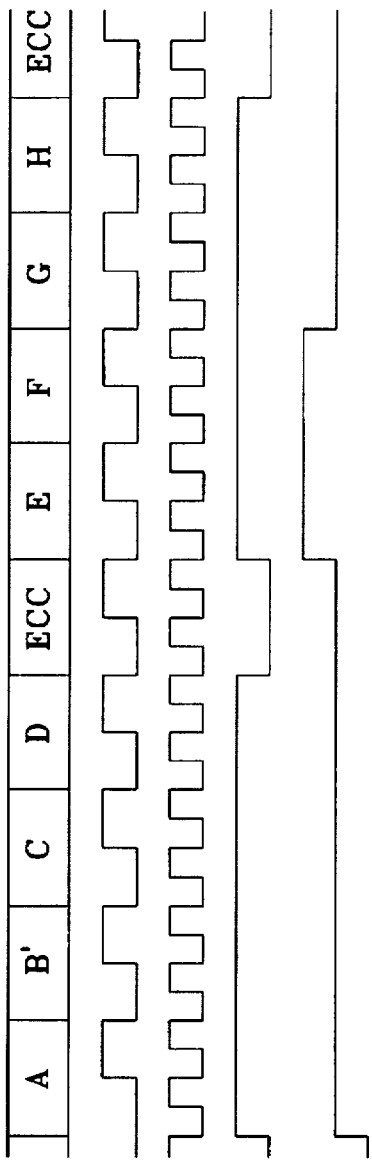
FIG. 4 is a time chart in the construction of FIG. 3.

The operation thereof will be explained with reference to FIG. 4. FIG. 4 shows an example where the second byte [B] is misplaced with [B'] among 4-byte data ([A], [B], [C], [D]).

When the data read signal from the processor 19 is switched ON, the read data from the read circuit (unillustrated) are inputted to the buffer memory 34 and the ECC decoder 35. Hereupon, the AND gate 30 is opened, and the VFO clocks synchronizing with the rotations of the magnetic disk are inputted to the write counter 31 and the buffer memory 34.

As illustrated in the Figure, the 4-byte data are thereby accumulated in the buffer memory 34. With this processing, the ECC decoder 35 receives the 4-byte data and the error correction code, checks the error and creates the error correction code.

In this way, when finishing the input of the subblock data, the transfer enable signal from the processor 19 is switched ON. The AND gate 32 is thereby opened, and the high-speed clock having a speed that is twice (½ cycle) as fast as the VFO clock is inputted to the read counter 33.

With this input, the 4-byte data of the buffer memory 34 are sequentially outputted to the EOR circuit 36 in accordance with the high-speed clocks. On the other hand, the ECC decoder 35, when the output of the read counter 33 coincides with the error displacement, outputs the error pattern corresponding to that error displacement to the EOR circuit 36. If not coincident, the ECC decoder 35 outputs [0] to the EOR circuit 36.

In the illustrative example, the error pattern is outputted in the data [B] position (second byte) because of the subblock data [B] being erroneous. The EOR circuit 36 thereby corrects the data [B'] read from the buffer memory 34 to the data [B] and outputs the corrected data.

Then, the subblock data after being corrected and the high-speed clock are outputted to the interface control circuit 17. The high-speed clock is utilized as a controller transfer sampling signal.

Further, the operation is also the same in the next subblock ([E], [F], [G], [H]).

In this manner, after correcting error in the subblock data inputted in synchronism with the rotations of the magnetic disc, the corrected subblock data are transferred at a high speed in asynchronism with the rotations of the magnetic disc. A transfer time can be thereby reduced. Hence, a data-to-data gap can be minimized.

Further, the subblock data are asynchronously transferred with the high-speed clock, and, therefore, an actualization thereof can be easily attained.

Figure 5:
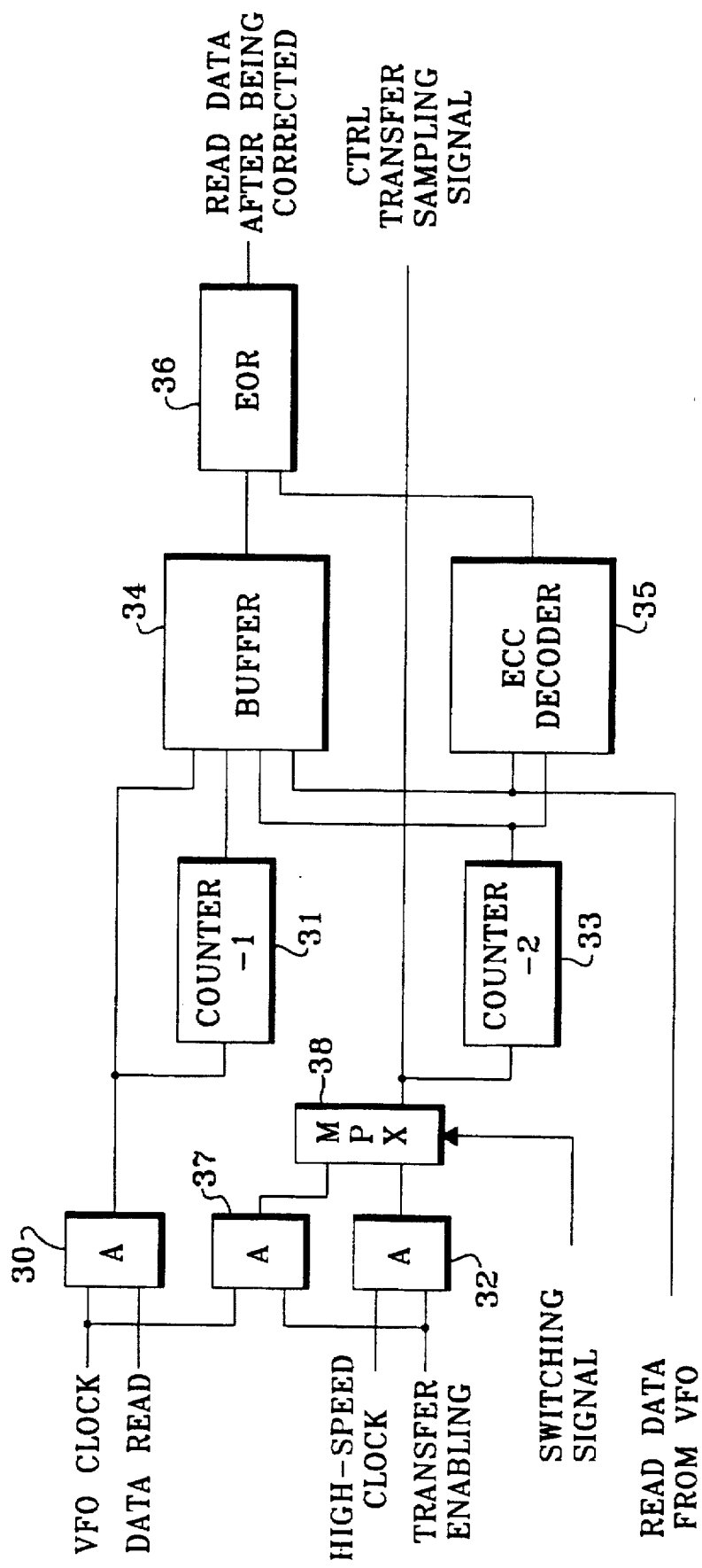
FIG. 5 is a circuit diagram illustrating the format control circuit in another embodiment of the present invention.
Figure 6:
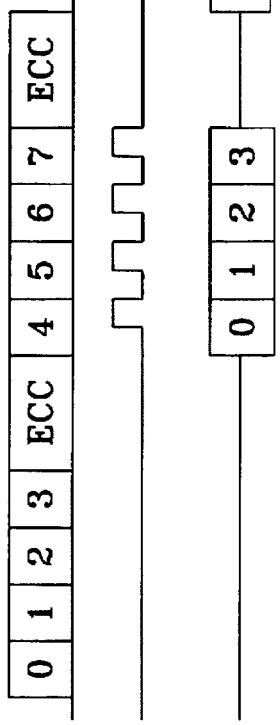
FIG. 6 is a time chart in the construction of FIG. 5.

FIG. 5 is a circuit diagram of a format control circuit in another embodiment of the present invention. FIG. 6 is a time chart thereof.

Referring to FIG. 5, the same elements as those shown in FIG. 3 are marked with the like numerals. An AND gate 37 outputs the VFO clock with the above transfer enable signal serving as a gate signal.

A multiplexer 38 switches over and outputs the VFO clock from the AND gate 37 and the high-speed clock from the AND gate 32 in accordance with a switching signal from the processor 19.

As illustrated in FIG. 6(A)-(C), a transfer time of the midway subblock of one block makes no contribution to the reduction in the above gap length, but a transfer time of the last subblock of the one read block contributes thereto. For this reason, in this embodiment, the data of the midway subblock of one block is transferred in synchronism with the rotation of the magnetic disc, whereas the data of only the last subblock is asynchronously transferred at the high speed.

That is, with respect to the subblocks exclusive of the last subblock, the VFO clocks of the AND gate 37 are outputted from the multiplexer 38, and the data in the midway subblock of one block is transferred in synchronism with the rotation of the magnetic disc. On the other hand, the data in the last subblock is asynchronously transferred at the high speed by outputting the high-speed clock of the AND gate 32 from the multiplexer 38 by use of the switching signal. The gap length can be also minimized in this manner.

Next, a skip control function in an on-the-fly correction will be discussed.

Figure 7:
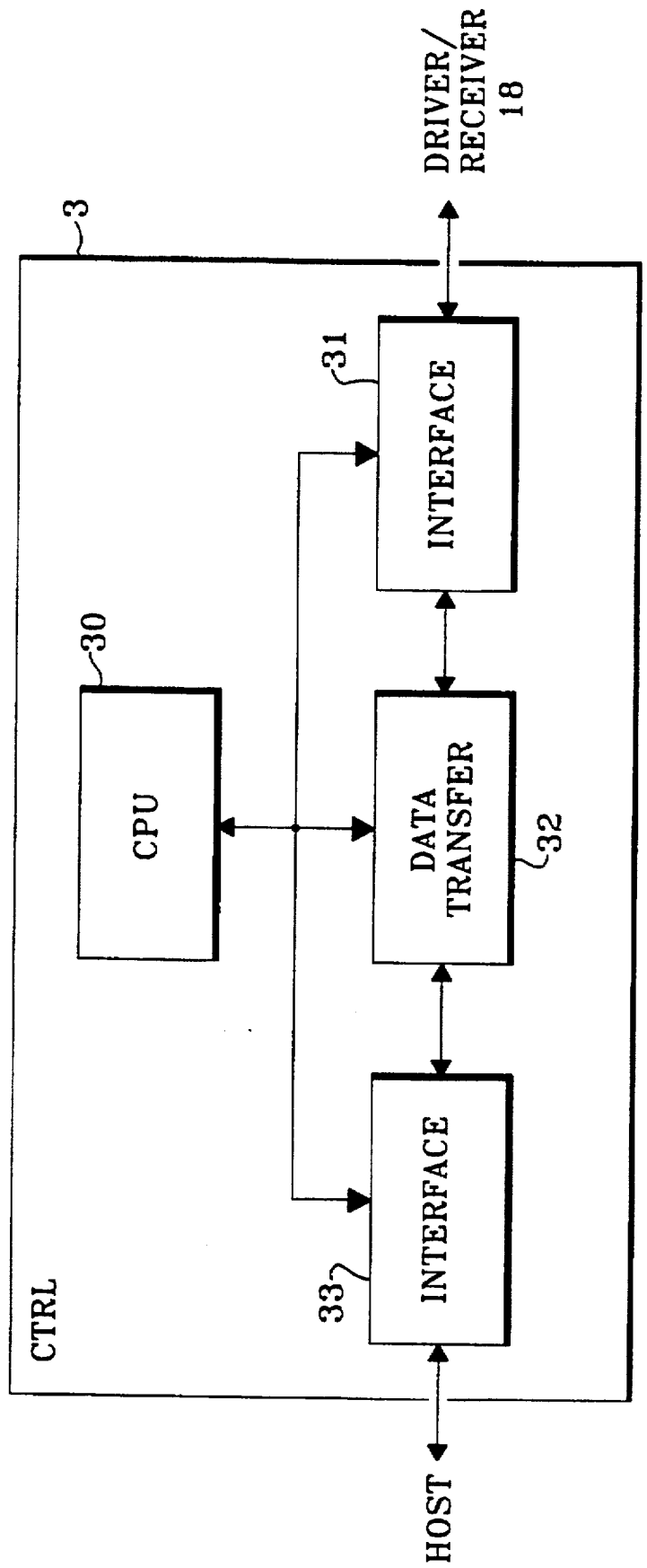
FIG. 7 is a block diagram showing a controller in the construction of FIG. 2.

FIG. 7 is a block diagram illustrating the magnetic disc controller in the construction of FIG. 2. FIG. 8 is a diagram showing a structure of a count part in the CKD format.

Referring to FIG. 7, a processor 30 is operated by a program read from a control memory and controls the data transfer. A first interface circuit 31 is connected to a driver/receiver 18 of the disc drive 1 shown in FIG. 2. Then, the first interface circuit 31 performs the data transfer with respect to the disc drive 1. A second interface circuit 33 is connected to an unillustrated host device. Then, the second interface circuit 33 effects the data transfer with respect to the host device. A data transfer circuit 32 is connected to the first and second interface circuits 31, 33 and transfers the data.

As illustrated in FIG. 8, a count part in the CKD format has a physical cell number PCN indicating a heading position of the count part with the above-mentioned cell number. This physical cell number PCN is recorded by use of a value smaller by 1 than a physical cell number to which the count part belongs.

Further, the count part is provided with seven skip control data parts SC0-SC6. Complements of skip control gap positions are recorded in these skip control data parts SC0-SC6. That is, distances from the index to respective defect positions are recorded in the skip control data parts SC0-SC6 in the form of the complements of the cell numbers to which the defects are belong.

Recorded further in the count part are a logical cell number LCN, a physical address PA, a flag F, a logical address ID, a key length KL, a data length DL and the error correction code of the count part.

Accordingly, the processor 30 of the controller 3 is capable of recognizing the defect position (skip control gap) from the data of this count part.

FIG. 9(A)-(F) is a time chart in one embodiment of the skip control according to the present invention.

The processor 19 shown in FIG. 2 indicates the drive control circuit 16 to create a cell signal shown in FIG. 9. This cell signal is a cyclic signal switched ON each time the magnetic head 102 reaches a cell boundary. The drive control circuit 16 creates this cell signal. This cell signal is transmitted to the controller 3 via the interface control circuit 17 and the driver/receiver 18.

The processor 30 in the controller 3 receives this cell signal via the interface circuit 31. Then, the processor 30 counts these cell signals, thereby detecting a present position of the magnetic head 102 on the cell-unit. Further, the processor 30 recognizes an existing position of the skip control gap from the skip control data SC0-SC6 of the count part explained in FIG. 8.

The processor 30, as illustrated in FIG. 9(A)-(F), before the magnetic head 102 comes to a skip control gap SC-GAP, issues a command 100 for executing the skip processing to the magnetic disc drive 1.

In the magnetic disc drive 1, the processor 19 responds to this command. Then, the processor 19 controls the format control circuit 15 and interrupts the reading operation of the magnetic head 102. In this example, the skip control gap SC-GAP corresponds to three cells, and, hence, the reading by the magnetic head 102 is interrupted for a 3-cell duration. Thereafter, the magnetic head 102 resumes the reading.

Thus, the controller 3 is informed of the cell signal indicating the position of the magnetic head from the magnetic disc drive 1 and therefore capable of detecting the magnetic head position. For this reason, the controller 3 is capable of, before the magnetic head 102 reaches the skip control gap SC-GAP, issuing the command 100 for executing the skip processing. Even when executing the on-the-fly correction, the skip control is thereby executable. FIG. 10(A)-(G) is a time chart in another embodiment of the skip control according to this invention.

In the embodiment of FIG. 10, an interface between the disc drive 1 and the controller 3 is provided with a signal line SC DETECT. The processor 30 transmits a skip control gap detect signal via this signal line to the magnetic disc drive 1. That is, the processor 30, in a cell position one before the skip control gap SC-GAP, informs the magnetic disc drive 1 of the skip control gap detect signal. FIG. 11(A)-(E) is a time chart showing still another embodiment of the skip control according to the present invention.

The processor 19 shown in FIG. 2 indicates the format control circuit 15 to create a pseudo sync-in signal illustrated in FIG. 11(A)-(E). This pseudo sync-in signal is generated in synchronism with the reading with respect to the head subblock of the key part and the data part of each record explained in FIG. 14A. This pseudo sync-in signal is, as in the same way with the normal sync-in signal, transmitted to the controller 3 via the interface control circuit 17 and the driver/receiver 18.

The processor 30 in the controller receives this pseudo sync-in signal and the sync-in signal via the interface circuit 31. Then, the processor 30 counts these signals and detects the present position of the magnetic head 102 on the cell-unit. Further, the processor 3 recognizes the existing position of the skip control gap from the skip control data SC0-SC6 of the count part described in FIG. 8.

The processor 30, as illustrated in FIG. 11, before the magnetic head 102 comes to a skip control gap SC-GAP, issues the command 100 for executing the skip processing to the magnetic disc drive 1.

Thus, the controller 3 is informed of the pseudo sync-in signal from the magnetic disc drive 1 and therefore capable of detecting the magnetic head position. For this reason, the controller 3 is capable of, before the magnetic head 102 reaches the skip control gap SC-GAP, issuing the command 100 for executing the skip processing. Even when executing the on-the-fly correction, the skip control is thereby executable.

Figure 13A:
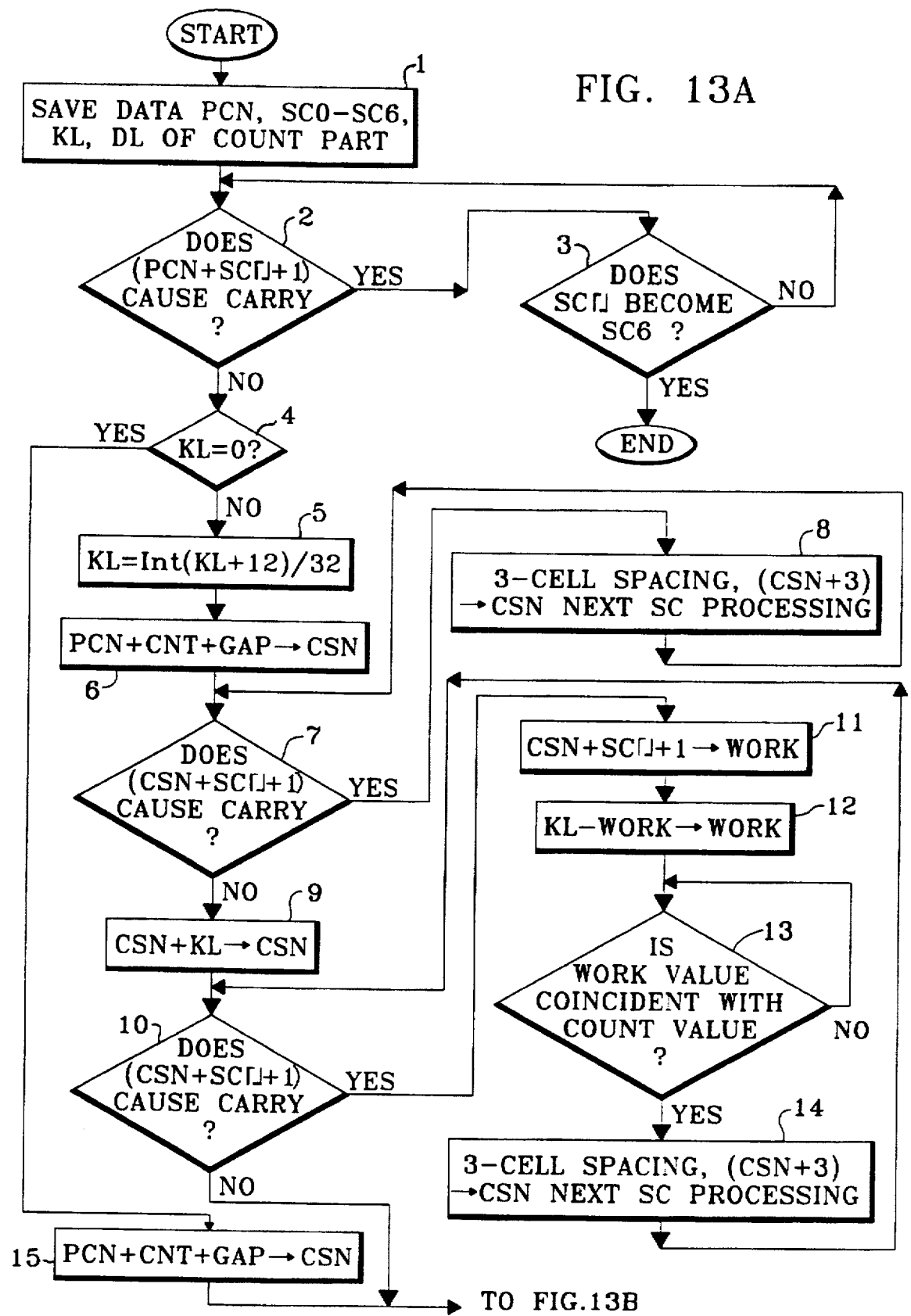
FIGS. 13A and 13B are processing flowcharts in the embodiment of FIG. 12.
Figure 13B:
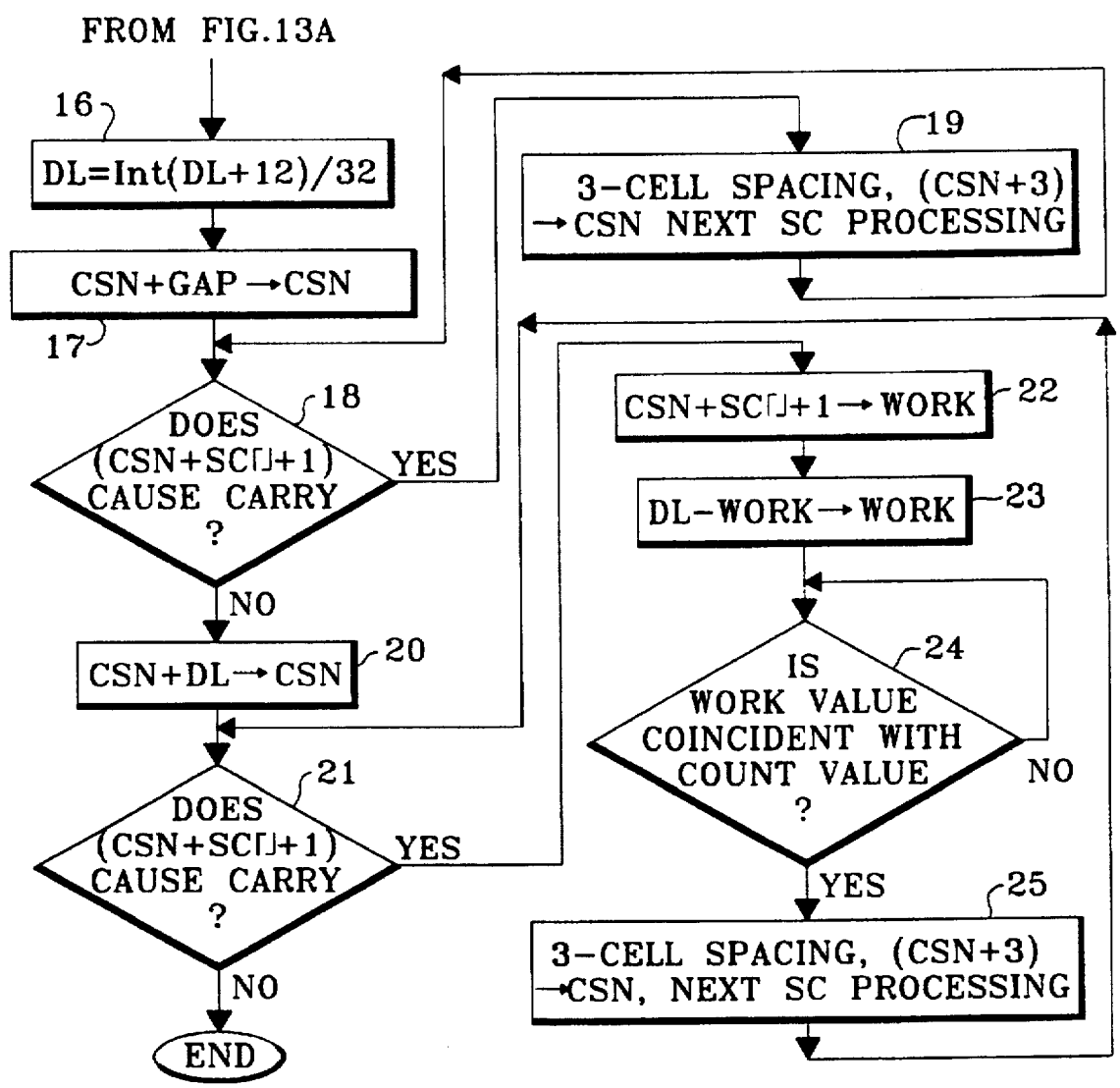

FIG. 12(A)-(E) is a time chart in a further embodiment of the skip control according to this invention. FIGS. 13A and 13B are flowcharts each showing the processing thereof.

In the embodiments of FIGS. 9 through 11, the processor 30 in the controller 3 recognizes the position of the skip control gap. In accordance with this embodiment, the processor 19 of the magnetic disc drive 1 recognizes the position of the skip control gap. Then, the skip processing is executed based on a determination by the drive 1 itself without depending on the indication of the controller 3.

Accordingly, as illustrated in FIG. 12(A)–(E), when the skip control gap exists in the head subblock of the key part and the data part of each record, the synchronous signal is transmitted to a tag-in signal line and tag-out signal line after completing the on-the-fly correction by the ECC of this subblock. Namely, the sequence of the synchronous signal and the command remains unchanged as usual.

Given next is an explanation of a flow of executing the skip processing with reference to FIGS. 13A and 13B.

(1) The processor 19 save the physical cell number PCN, the skip control data SC0–SC6, the key length KL and the data length DL of the count part explained in FIG. 8, in the memory.

(2) Next, the processor 19 examines whether or not there is a skip control gap to be processed. That is, the processor 19 performs a calculation of (PCN+SC[]+1) and examines whether a carry defined as a carry output occurs or not. As described above, the positions of all the skip control gaps existing within that track are recorded in the skip control data SC0–SC6 of the count part. Accordingly, the calculation of the above formula is intended to check whether or not the skip control gap is a gap after the magnetic head has already passed. Incidentally, SC[] indicates that the skip control data SC0–SC6 are sequentially replaced, and the calculations are thus conducted.

For instance, when a calculation of (PCN+SC0+1) conduces to a occurrence of the carry, the skip control gap designated by SC0 indicates a gap through which the magnetic head passes. It is because a complement of the skip control gap position is recorded in the skip control data SC[].

(3) The processor 19, when the calculation of (PCN+SC[]+1) leads to the occurrence of the carry, checks whether or not SC[] becomes SC6. Then, the processor 19, when the arithmetic result in step (2) indicates the carry up to SC6, determines that the magnetic head passes through all the defects, and the operation comes to an end.

(4) In step (2), when the calculation of (PCN+SC[]+1) conduces to non-occurrence of the carry, this indicates that the skip control gap to be processed exists in the position (position's complement) shown by SC[]. Hence, the processor 19 checks whether the key part exists or not. That is, the processor 19 determines whether the key length KL is [0] or not.

The processor 19, when the key length KL is [0], determines that the key part does not exist, and the operation jumps over the skip processing of the key part to step (15).

(5) On the other hand, the processor 19, when the key length is not [0], determines that the key part exists. Then, the processor 19 converts the key part length KL into the number of cells. Namely, there is performed a calculation such as KL=Int (KL+12)/32.

Figure 17:
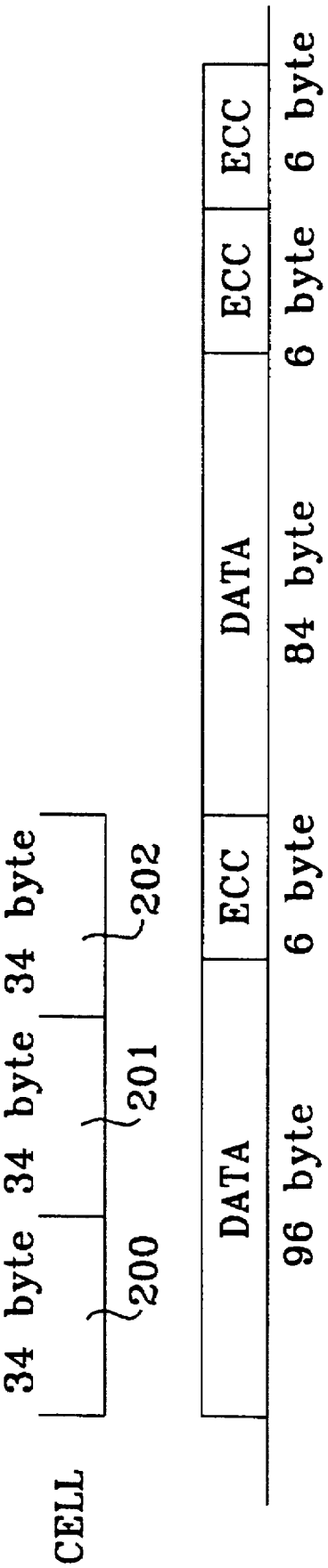
FIG. 17 is an explanatory diagram of assistance in explaining the prior art but shows a cell management technique.

In this formula, the key length read from the count part does not include a length of the ECC shown in FIG. 17, and, therefore, 12-byte ECC is added to a 1-block length indicated by KL. Further, one cell consists of 32 bytes, and hence a division by 32 bytes is to be effected.

(6) Next, the processor 19 calculates the cell number indicating the heading of the key part. That is, the processor 19 performs a calculation such as (PCN+CNT+GAP), thus obtaining a count cell number CNS. This involves adding a count part length CNT to the physical cell number PCN read from the count part and further adding the predetermined gap length GAP existing in front of the key part.

(7) Subsequently, the processor 19 checks whether or not the skip control gap exists up to the heading of the key part. That is, the processor 19 performs a calculation of (CSN+SC[]+1) and checks whether or not the carry defined as the carry output takes place.

(8) The processor 19, when the carry occurs, determines that the skip control gap exists up to the heading position of the key part.

Then, the processor 19 spaces the magnetic head three cells apart. Thus, the skip processing is performed. Subsequently, the CSN is updated to (CSN+3), and the operation returns to step (7).

(9) On the other hand, the processor 19, if no carry takes place, determines that the skip control gap does not exist up to the heading position of the key part. Then, the processor 19 calculates the last cell position of the key part. That is, the key length KL converted into the number of cells is added to the CSN. This is set as a count cell number CSN.

(10) Next, the processor 19 checks whether or not the skip control gap exists in the key part by use of the count cell number CSN.

Namely, the processor 19 performs a calculation of (CSN+SC[]+1) and examines whether or not the carry conceived as the carry output occurs. The processor 19, if no carry takes place, determines that the skip control gap does not exist in the key part, and the operation proceeds to step (16).

(11) The processor 19, when the carry occurs, determines that the skip control gap exists in the key part. The processor causes the register to store an arithmetic value of (CSN+SC[]+1) in the form of WORK.

(12) Since the count cell number CSN obtained in step (9) is the last position of the key part, a position of the skip control gap from the heading position of the key part is calculated from this WORK value. That is, (KL–WORK) is calculated, thus obtaining new WORK.

(13) The processor 19 counts the number of cells from the heading of the key part. Then, the processor 19 compares the WORK value obtained in step (12) with the number of cells counted.

(14) The processor 19, if the WORK value obtained in step (12) coincides with the number of cells counted, determines that the magnetic head reaches a defect position (position of the skip control gap). Subsequently, the processor 19 spaces the magnetic head three cells apart. Thus, the skip processing conducted. Then, the CSN is updated to (CSN+3), and the operation goes back to step (10).

(15) In step (4), when no key part exists, the processor 19, as in the same way with step (6), performs a calculation of (PCN+CNT+GAP), thus obtaining a count cell number CSN.

(16) Next, the processor 19 converts a length of the data part into the number of cells. Namely, the number-of-cell data length DL is calculated by effecting arithmetic such as DL=Int (DL+12)/32.

(17) Next, the processor 19 calculates the cell number indicating the heading of the data part. That is, (CSN+GAP) is calculated by using the count cell number CSN obtained in step (15) or (14). In this formula, a length of the gap existing in front of the data part is added to the count cell number CSN.

(18) Next, the processor 19 examines whether or not the skip control gap exists up to the heading of the data part. That is, the processor 19 performs a calculation of (CSN+SC[]+1) and checks whether or not the carry defined as the carry output occurs.

(19) The processor 19, when the carry occurs, determines that the skip control gap exists up to the heading position of the data part. Then, the processor 19 spaces the magnetic head three cells apart. Thus, the skip processing is performed. Subsequently, the CSN is updated to (CSN+3), and the operation returns to step (18). (20) On the other hand, in step (18), the processor 19, if no carry takes place, determines that the skip control gap does not exist up to the heading position of the data part. Then, the processor 19 calculates the last cell position of the data part. That is, the data length DL converted into the number of cells is added to the CSN. This is set as a count cell number CSN.

(21) Next, the processor 19 checks whether or not the skip control gap exists in the data part by use of the count cell number CSN obtained in step (20). Namely, the processor 19 performs a calculation of (CSN+SC[]+1) and examines whether or not the carry conceived as the carry output occurs. The processor 19, if no carry takes place, determines that the skip control gap does not exist in the data part, and the operation comes to an end.

(22) The processor 19, when the carry occurs, determines that the skip control gap exists in the data part. The processor causes the register to store an arithmetic value of (CSN+SC[]+1) in the form of WORK.

(23) Since the count cell number CSN obtained in step (22) is the last position of the data part, a position of the skip control gap from the heading position of the data part is calculated from this WORK value. That is, (DL WORK) is calculated, thus obtaining new WORK.

(24) The processor 19 counts the number of cells from the heading of the data part. Then, the processor 19 compares the WORK value obtained in step (23) with the number of cells counted.

(25) The processor 19, if the WORK value obtained in step (23) coincides with the number of cells counted, determines that the magnetic head reaches a defect position (position of the skip control gap). Subsequently, the processor 19 spaces the magnetic head three cells apart. Thus, the skip processing conducted. Then, the CSN is updated to (CSN+3), and the operation goes back to step (21).

In this way, the processor 19 of the magnetic disc drive recognizes the position of the skip control gap and executes the skip processing. Note that the processor 30 of the controller 3 also recognizes the position of the skip control gap by effecting the same steps.

In addition to the embodiments discussed above, although the disc apparatus has been described in the form of the magnetic disc apparatus, the present invention may be applied to other disc apparatuses such as a magneto-optic disc apparatus, etc.

The present invention has been discussed so far by way of the embodiments but can be modified in a variety of forms within the scope of the gist of the present invention. These modifications are not excluded from the scope of the present invention.

As discussed above, according to the present invention, the subblock synchronizing with the rotation of the disc is, after correcting the error thereof, asynchronously transferred at the high speed, and hence the transfer time can be reduced. It is thus possible to minimize the data-to-data gap in the CKD format.

Further, even when performing the on-the-fly correction, the skip control can be carried out by recognizing the position of the magnetic head.

What is claimed is:

1. A method of transferring data in a disc apparatus including a disc drive for transferring, after a head has read the data from a storage disc, the read data to a disc controller, the disc controller transferring the read data from the disc drive to a host device, said method comprising:

a step of reading data from said storage disc, the data being recorded in a format on said storage disc and having one block composed of a plurality of subblocks each added with an error correction code;

a step of detecting an error in the data read from said storage disc by use of an error detection code on a subblock-unit; and a step of transferring, after correcting the data of the error-detected subblock, the corrected data to said disc controller on the subblock-unit, said transferring step including a step of transferring the subblocks, exclusive of the last subblock of said block, to said disc controller at the reading speed; and a step of transferring the data of the last subblock of said block to said disc controller at the speed higher than the reading speed.

2. A method of transferring data in a disc apparatus according to claim 1, wherein said detecting step is a step of writing the read data to a buffer memory at the reading speed and, at the same time, detecting the error of the subblock by use of the error detection code through an error correction circuit.

3. A method of transferring data in a disc apparatus according to claim 2, wherein said transferring step is a step of correcting, after reading the data of the subblock from said buffer memory at the speed higher than the reading speed, the data of the subblock by use of an error correction signal of said error correction circuit and transferring the corrected data.

4. An apparatus for transferring data in a disc apparatus including a disc drive for transferring, after a head has read the data from a storage disc, the read data to a disc controller, the disc controller transferring the read data from the disc drive to a host device, said apparatus comprising:

a read circuit for reading data from said storage disc, the data being recorded in a format on said storage disc and having one block composed of a plurality of subblocks each added with an error correction code;

an error detection circuit for detecting an error in the read data by use of an error detection code on a subblock-unit; and a data transfer circuit for transferring, after correcting the data of the error-detected subblock, the corrected data to said disc controller on the subblock-unit, said data transfer circuit transferring the subblocks, exclusive of the last subblock of said block to said disc controller at the reading speed, and transferring the data of the last subblock of said block to said disc controller at the speed higher than the reading speed.

5. An apparatus for transferring data in a disc apparatus according to claim 4, wherein said data transfer circuit further includes a buffer memory to which the read data is written at the reading speed and from which the data is read at the speed higher than the reading speed.

6. An apparatus for transferring data in a disc apparatus according to claim 5, wherein said data transfer circuit is a circuit for reading the data from said buffer memory at the speed higher than the reading speed, correcting the data by an error correction signal of said error correction circuit and thereafter transferring the data.

* * * * *